United States Patent
Hars et al.

(10) Patent No.: US 9,015,401 B2
(45) Date of Patent: Apr. 21, 2015

(54) SELECTIVE PURGE OF CONFIDENTIAL DATA FROM A NON-VOLATILE MEMORY

(75) Inventors: Laszlo Hars, Lafayette, CO (US); Monty Aaron Forehand, Loveland, CO (US); Donald Preston Matthews, Jr., Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 202 days.

(21) Appl. No.: 13/096,658

(22) Filed: Apr. 28, 2011

(65) Prior Publication Data

US 2012/0278529 A1 Nov. 1, 2012

(51) Int. Cl.
- *G06F 12/00* (2006.01)
- *G06F 12/02* (2006.01)
- *G06F 3/06* (2006.01)
- *G06F 12/10* (2006.01)
- *G06F 12/14* (2006.01)

(52) U.S. Cl.
CPC ............ *G06F 12/0246* (2013.01); *G06F 3/061* (2013.01); *G06F 3/0679* (2013.01); *G06F 3/064* (2013.01); *G06F 12/10* (2013.01); *G06F 12/1408* (2013.01); *G06F 2212/1052* (2013.01); *G06F 2212/7204* (2013.01)

(58) Field of Classification Search
CPC ................ G06F 3/0652; G06F 3/0644; G06F 2212/7205; G06F 12/1441
See application file for complete search history.

(56) References Cited

U.S. PATENT DOCUMENTS

| | | | |
|---|---|---|---|
| 6,195,293 B1 * | 2/2001 | Yun et al. | 365/185.29 |
| 7,219,302 B1 | 5/2007 | O'Shaughnessy et al. | |
| 7,275,139 B1 * | 9/2007 | Tormasov et al. | 711/159 |
| 7,475,203 B1 * | 1/2009 | Petrillo et al. | 711/159 |
| 7,690,030 B1 | 3/2010 | Ma et al. | |
| 8,130,554 B1 * | 3/2012 | Linnell | 365/185.28 |
| 8,171,309 B1 * | 5/2012 | Poo et al. | 713/189 |
| 2006/0218412 A1 * | 9/2006 | Hars et al. | 713/193 |
| 2007/0226404 A1 | 9/2007 | Ito et al. | |
| 2008/0046997 A1 * | 2/2008 | Wang | 726/16 |
| 2008/0082836 A1 * | 4/2008 | Osaki | 713/193 |
| 2008/0162784 A1 * | 7/2008 | Obereiner et al. | 711/103 |
| 2008/0270724 A1 * | 10/2008 | Ramesh et al. | 711/163 |
| 2009/0157948 A1 * | 6/2009 | Trichina et al. | 711/103 |
| 2009/0196100 A1 | 8/2009 | Merry, Jr. et al. | |
| 2010/0161928 A1 * | 6/2010 | Sela et al. | 711/163 |
| 2011/0072188 A1 * | 3/2011 | Oh et al. | 711/102 |
| 2011/0264925 A1 * | 10/2011 | Russo et al. | 713/193 |

* cited by examiner

*Primary Examiner* — Aimee Li
*Assistant Examiner* — Michael C Kolb
(74) *Attorney, Agent, or Firm* — Hall Estill Attorneys at Law (57) ABSTRACT

Method and apparatus for the non-destructive, selective purging of data from a non-volatile memory. In accordance with various embodiments, multiple copies of a selected set of confidential user data having a common logical address are stored to a confidential data portion of a non-volatile memory so that each copy is in a different location within the confidential data portion. A nondestructive purge of all said copies from the confidential data portion is carried out responsive to an externally supplied selective purge command so that all said copies are erased and other, non-purged confidential user data remain stored in the confidential data portion.

20 Claims, 7 Drawing Sheets

DESIGNATION TABLE

| LBA RANGE | DESIGNATION |
|---|---|
| 0 TO X | STANDARD |
| (X+1) TO Y | CONFIDENTIAL |
| (Y+1) TO Z | STANDARD |

SELECTIVE PURGE OF CONFIDENTIAL DATA FROM A NON-VOLATILE MEMORY

SUMMARY

Various embodiments of the present invention are generally directed to the selective purging of data from a non-volatile memory.

In accordance with various embodiments, an exemplary method generally comprises storing multiple copies of a selected set of confidential user data having a common logical address to a confidential data portion of a non-volatile memory so that each copy is in a different location within the confidential data portion. A nondestructive purge operation is carried out responsive to an externally supplied selective purge command so that all the copies of the selected set of confidential user data are purged from the confidential data portion. Other, non-purged confidential user data associated with a different logical address remain stored in the confidential data portion.

These and other features and advantages which characterize the various embodiments of the present invention can be understood in view of the following detailed discussion and the accompanying drawings.

DETAILED DESCRIPTION

The present disclosure generally relates to data security, and more particularly to a method and apparatus for purging all copies of a particular set of confidential data from a memory.

Memory devices, such as hard disc drives (HDDs), solid-state drives (SSDs), flash memory "thumb" drives, hybrid devices, multi-memory systems, etc., are used in a wide number of consumer, commercial, governmental and military applications. Data security can be an important consideration with such devices.

It is often desirable that a memory be subjected to a special memory sanitizing operation to ensure that previously stored data in the memory cannot be easily recovered by an unauthorized third party. A number of U.S. Federal and State Regulations require memory devices to be securely erased under certain circumstances, and failure to do so may result in civil and/or criminal penalty. Some well-known governmental standards that set forth various requirements for secure erasure include the NIST 800-88 Enhanced Secure Erase Standard and the DoD 5220 Block Erasure Standard.

These and other standards provide a variety of ways in which non-destructive erasure of a memory can be carried out. In this context, non-destructive erasure generally refers to removal of previously stored data from a memory location in such a way that the erased memory locations remain intact for future use in storing data, and does not necessarily require a special "erasure" operation that is different from a normal data write operation.

In some cases, a non-destructive erasure can take place by overwriting existing data a number of consecutive times in order to mask the magnetic, electrical and/or optical signatures of previous storage states. Even when a memory cell has been subjected to multiple writes/erasures, however, a sophisticated and motivated attacker may still be able to use a variety of laboratory techniques to recover the previously stored data from the medium.

Many existing secure erasure techniques can be time and power consuming, and in some cases can significantly reduce the remaining operational life of the memory. Some types of flash memory cells that store data in a multi-level cell (MLC) configuration may be initially limited to a total number of around 5,000 erasure cycles. Thus, conventional secure erase operations that involve numerous repeated erasures may tend to significantly reduce the lifetime of the device, and may not fully secure the device from informational leakage.

There may be situations where a user may wish to remove all traces of a particular confidential user data set, including all copies and/or revisions of that data set from the memory, while leaving other stored data in the memory unaffected and available for future retrieval. Such selected erasure operations can present particular difficulty when different versions of the confidential user data set (including altered revisions and identical copies) are not all stored in one place, but are rather distributed in different locations such as throughout the memory array.

Accordingly, various embodiments of the present invention are generally directed to a method and apparatus for carrying out a data set level confidential data purge operation. As explained below, a memory may be arranged into a number of portions of memory, including one or more confidential data portions to which confidential user data are to be stored and one or more standard data portions to which standard user data are to be stored.

The memory module operates to store confidential user data in the confidential data portion(s), and standard user data in the standard data portion(s). The host device may identify the data as confidential in the context of a write command with which the data are supplied to the storage device. Alternatively, the confidential data may be identified on a range basis; for example, a particular range of LBAs may be denoted as a confidential data range, so that the storage device will know to treat data within such range as confidential data. This can be carried out dynamically as needed. Other mechanisms can be used as desired.

An externally supplied purge command may be used to initiate the purge operation. In some embodiments, the purge command directs the storage device to purge confidential data associated with a particular logical address, such as a particular file (group of data sectors). The storage device generally operates responsive to the purge command to remove all copies of the confidential data associated with the selected logical address while retaining other confidential and standard data in the array. The copies may be different versions of a particular data set, or identical copies of the same data, and will be stored at different physical addresses within the memory space. The purge operation can be carried out in cryptographic ways so that the entire data set is physically removed from the media, or internal auxiliary data such as internal keys are destroyed, thereby eliminating the ability to access the stored copies.

The various approaches disclosed herein can be used in any number of different types of memory devices, such as solid-state non-volatile memory arrays including but not limited to flash memory, spin-torque transfer random access memory (STRAM), resistive random access memory (RRAM), and programmable logic cells (PLCs). The various approaches can also be adapted to other types of storage media such as but not limited to magnetic recording discs.

These and other features and considerations will be discussed beginning with a review of FIG. 1 which generally illustrates an exemplary data storage device 100. The device 100 includes a controller 102 and a memory module 104. The controller 102 provides top level control for the device 100 and may be configured as a programmable processor with associated programming in local memory.

The memory module 104 can be arranged as one or more non-volatile memory elements such as rotatable recording discs or solid-state memory arrays. While a separate controller 102 is shown in FIG. 1, such is unnecessary as alternative embodiments may incorporate any requisite controller functions directly into the memory module. While not limiting, for purposes of the present discussion it will be contemplated that the data storage device 100 is a solid-state drive (SSD) that utilizes flash memory cells in the memory module 104 to provide a main data store for a host device (not shown).

The host device can be any device that communicates with the storage device 100. For example and not by way of limitation, the storage device may be physically incorporated into the host device, or the host device may communicate with the host device via a network using any suitable protocol.

Figure 1:
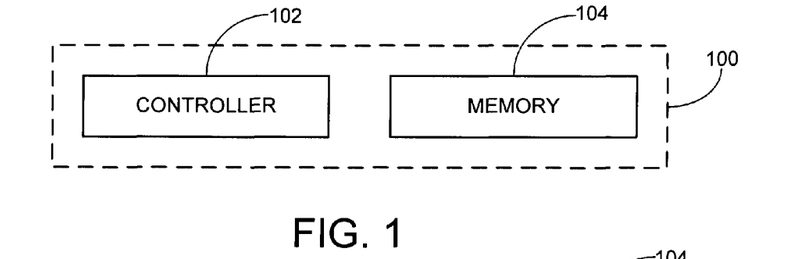
FIG. 1 provides a functional block representation of an exemplary data storage device in accordance with some embodiments.
Figure 2:
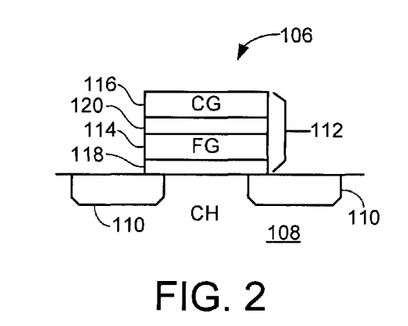
FIG. 2 shows a flash memory cell construction that can be used in the device of FIG. 1.

FIG. 2 illustrates an exemplary flash memory cell 106 that can be incorporated into the memory module 104 of FIG. 1. The memory cell 106 as shown in FIG. 2 is formed on a semiconductor substrate 108 having spaced apart n+ doped regions 110. A gate structure 112 spans the pair of adjacent doped regions so that the flash cell 106 takes a general nMOS transistor configuration. A series of adjacent flash cells can be formed in a NAND configuration with a gate structure 112 spanning each adjacent pair of doped regions 110.

Each gate structure 112 provides an alternating stack of electrically conductive gates 114, 116 and electrically insulative regions 118, 120. Data are stored by each cell 106 in relation to the relative amount of electrical charge stored on the lower gate 114, which is characterized as a floating gate (FG).

The FG 114 accumulates charge during a programming operation by the selected application of appropriate voltages to the adjacent doped (drain and source) regions 110 and the upper gate 116, characterized as a control gate (CG). These applied voltages induce the controlled migration of electrical charge from a channel (CH) portion of the semiconductor substrate 108 to the FG 114 across insulative region 118.

In an initial erased state, there will be substantially no accumulated charge on the FG 114. In this state, the cell will exhibit drain-source conductivity across the channel CH without the application of voltage to the CG 116. Once charge has been accumulated on the FG 114, the drain-source path will be non-conductive unless a sufficiently high gate control voltage is applied to the CG 116, at which point the cell becomes conductive. The programmed state of the cell 106 can thus be determined by observing the level of CG voltage required to allow drain-source current to pass through the cell, which generally correlates to the amount of accumulated charge on the FG 114.

The cells 106 can be configured as single-level cells (SLCs) or multi-level cell (MLCs). An SLC flash cell stores a single bit; a normal convention is to assign the logical bit value of 1 to an erased cell (substantially no accumulated charge) and a logical bit value of 0 to a programmed cell (presence of accumulated charge). An MLC flash memory cell stores multiple bits, such as two bits. Generally, n bits can be stored using $2^n$ storage states. A normal convention is to assign the multi-bit logical value 11 to an erased cell with charge C0 (substantially no accumulated charge), and then sequentially assign multi-bit logical values 10, 01 and 00 to increasingly higher charge levels C1, C2 and C3 where C0<C1<C2<C3.

A special erasure operation is generally required to remove accumulated charge from the FG 114. An erasure can be carried by the application of a relatively high voltage to the CG 116 to cause migration of the charge from the FG 114 back to the channel across region 118. A different set of voltages may be applied to the cell 106 to thereafter add charge to the FG 114 during a data write operation.

Figure 3:
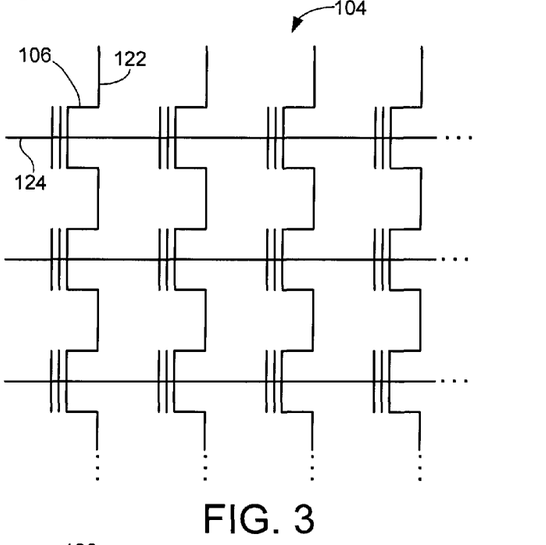
FIG. 3 is a schematic depiction of a portion of a flash memory array using the cells of FIG. 2.

The memory cells 106 can be arranged in the memory module 104 as an array of rows and columns of the memory cells, as depicted in FIG. 3. Each column of cells can be coupled via one or more bit lines (BL) 122. The control gates (CG) 116 of the cells 106 along each row can be interconnected via individual word lines (WL) 124.

Figure 4:
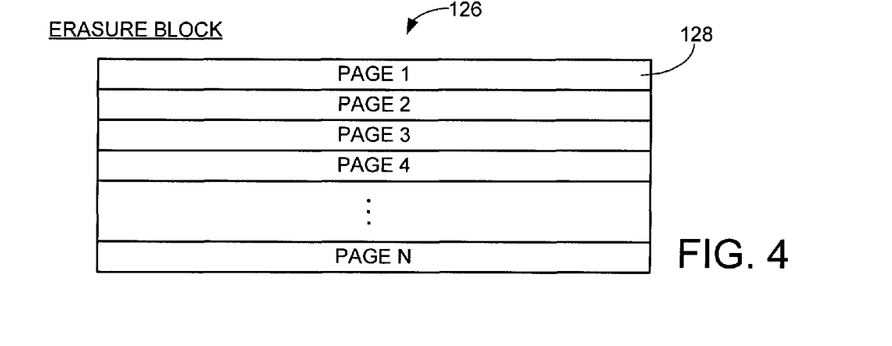
FIG. 4 illustrates a format for an erasure block.

The array of memory cells 106 shown in FIG. 3 may further be grouped into erasure blocks 126, as depicted in FIG. 4. Each erasure block 126 is a separately addressable block of memory and represents the smallest unit of memory that can be concurrent erased at a time. Each row of cells is referred to as a page 128, and each page is configured to store a selected amount of user data. An exemplary block size may be 128 pages of memory, with 8192 (8 KB) bytes per page. Other sizes and configurations can be used.

Block-level wear leveling may be employed by the controller 102 to track the erase and write status of the various blocks 126. New blocks will be allocated for use as required to accommodate newly received data. In at least some embodiments, a full page worth of data is written to each page at a time. Multiple user data sectors of data (each having an associated logical address, such as a logical block address, LBA) may be written to the same page, and a given LBA's worth of data may be physically stored so as to span multiple pages. Filler bits may be appended to a selected set of input data if a full page worth of data is not supplied for writing in a given write operation. Error correction codes such as parity bits may be incorporated at the page level to correct errors as a full page worth of data is retrieved. Metadata and other control information may be stored in each erasure block 126, or stored elsewhere such as in specific blocks dedicated to this purpose.

If data for a particular LBA are presently stored in a first page (with a first physical address) and the device 100 receives a write command to write new, updated data for that LBA, the controller 102 may select a second, new page (with a different physical address) to store the updated data and mark the LBA data in the first page as old data. When all of the data in a page are superseded, the page is marked for erasure. When enough pages in a given block are marked for erasure, a garbage collection operation may be scheduled in the background to copy current version data to a new block and to erase the existing block.

Figure 5:
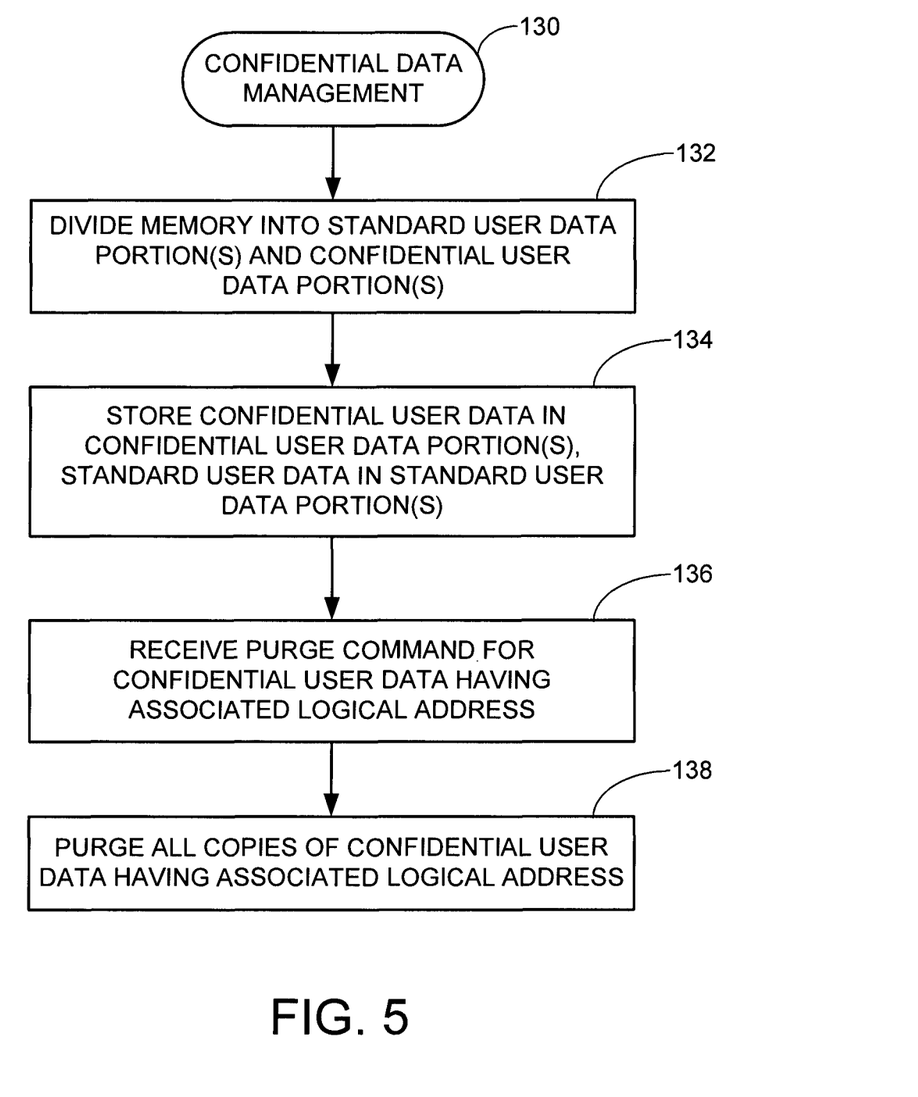
FIG. 5 is a flowchart for a CONFIDENTIAL DATA MANAGEMENT routine illustrative of exemplary steps that may be carried out in accordance with various embodiments of the present invention.

FIG. 5 illustrates a confidential data management routine 130, illustrative of steps carried out by the device 100 in accordance with various embodiments of the present invention to manage confidential data stored by the device 100. Each of the various steps shown in FIG. 5 will be discussed in detail hereafter. It will be appreciated that other sequences of steps can be utilized depending on the application, so that the various steps are merely exemplary and may be omitted, modified or appended.

The sequence of steps in FIG. 5 includes a partitioning step 132. A memory such as the memory 104 may be partitioned (divided) during this step into one or more standard user data portions and one or more confidential user data portions. As shown by step 134, the standard user data portions are used to store standard user data received from a host device, and the confidential user data portions are used to store confidential user data received from the host. This division is internal to the storage device and is transparent to the host device, so that the host continues to view the memory area as a single addressable area in which to store data (e.g., a single disk partition, volume, device, etc.).

As shown by step 136, a purge command may be issued to the storage device 100 to purge a particular set of the confidential user data from the device so that all versions (which may include both revisions and identical copies) of the data are removed from the device while leaving other confidential data in the device. For example, the user of a host device coupled to the storage device may desire to purge a particular data file from the storage device. Alternatively, the user may desire to purge a particular range of data sectors from the memory regardless whether these data sectors make up one or more host level files. It is contemplated that the purge command will identify the particular set of confidential data to be purged. This may be carried out by supplying one or more logical addresses (e.g., LBAs) associated with the selected confidential data to be purged.

At step 138, the device 100 operates responsive to the purge command to carry out a non-destructive purging of the selected confidential data. At the conclusion of the purging operation, the locations where the confidential data were stored remain functional and operable for the storage of new data, and remaining data in the storage device, such as other confidential and standard data, remain stored in the memory.

Figure 6:
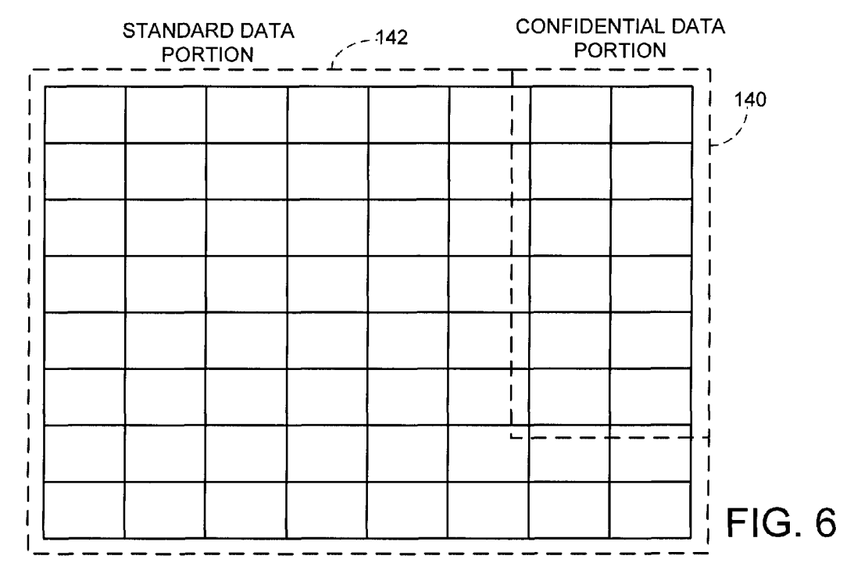
FIG. 6 shows a partitioning of a number of erasure blocks into a standard data portion and a confidential data portion.

FIG. 6 shows a portion of the memory array 104 as a grouping of erasure blocks 126 from FIG. 4. It is contemplated that the memory array 104 may include any number of such blocks, including blocks on different dies, strips, planes, chips, layers and arrays. Each of the erasure blocks 126 may be separately erasable and the controller 102 may track control information for each erasure block, such as a total number of erasures, date stamp information relating to when the various blocks have been allocated, etc.

Overprovisioning techniques may be used by the device 100 so that a larger number of erasure blocks 126 are provided in the array as compared to the specified total data capacity of the device. For example, a storage device rated at 2 terabytes, TB ($2 \times 10^{12}$ bytes) of user data storage capacity may have a greater amount of total capacity, such as 4 TB, but may only report the lower capacity value to the user. The provisioning of "extra" blocks enhances the ability of the device 100 to carry out garbage collection and wear leveling operations to maintain performance levels and operational life of the device.

In accordance with some embodiments, a subset of the total number of available erasure blocks may be designated as a confidential data portion of the memory, as denoted by dotted line enclosure 140. User data received from a host device denoted as confidential data may be stored to the confidential data (CD) portion 140. A remaining portion of the memory, denoted by dotted enclosure 142, may be denoted as a standard data portion. Data not identified by the host as confidential information, e.g., standard data (SD), will be stored to the portion 142. While just a single CD portion 140 and a single SD portion 142 are shown, it will be appreciated that multiple SD and/or CD portions can be provided. The erasure blocks in each portion need not be physically contiguous, nor does each portion need to be any particular size. Moreover, the portion of the array reserved for confidential data need not be static or fixed, and the various techniques used herein can be applied to clean up portions of the memory no longer used for confidential data storage.

At this point it will be noted that, in one sense, all of the user data received by the storage device 100 can be characterized as "confidential" information. This is because the device may take reasonable steps to maintain the confidentiality of such data, including the use of encryption and other security techniques to reduce the likelihood that an attacker may be able to recover such data in a security attack or analysis of the device.

However, as used herein, the distinction between "standard" and "confidential" data relates to a non-standard security level applied to the latter type of data. More specifically, "confidential data" in the present context means data that are specially processed by the device 100 in such a way that a purge command can be applied as set forth in FIG. 5. Confidential data thus have a non-standard security level, whereas standard data are treated as having a standard security level. While it is contemplated that the confidential data will have a heightened security level as compared to standard data, alternatives are envisioned wherein the standard security level is heightened as compared to the confidential security level.

While not required, restricting storage of the confidential data to the confidential data portion 140 reduces the complexity of the purge operation since the confidential data to be purged is limited to a subset of the total available data space. This can eliminate the need to search the entire data space when seeking prior copies of the confidential data set to be purged. It is thus contemplated that the purge command can be carried out in a reduced amount of time, and with a greater likelihood of success in that there is less chance that a stray copy of the purged data is overlooked.

Figure 7:
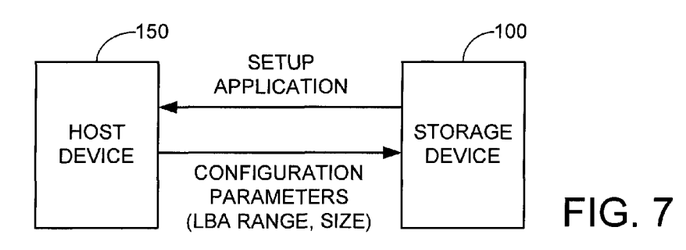
FIG. 7 is a basic functional block diagram illustrating data exchanges between a storage device and a host device.

FIG. 7 shows the storage device 100 in conjunction with a host device 150. The host device and the storage device communicate over a suitable communication pathway. In some embodiments, the storage device 100 can be configured to transfer a request to the host for configuration information, such as in the form of a setup application that is transferred to and executed by the host device. This setup application may be transferred when the storage device 100 is first connected to the host device.

In this scheme, the application requests the host to supply certain configuration parameters, and may be in the form of a graphical user interface (GUI) that requests a user of the host to make such designations. Any suitable configuration parameters can be specified at the host level. For example, the parameters may specify the total amount of storage space to be made available to the host for the storage of confidential data sets, on a total storage space size basis (e.g., 100 megabytes, MB) or percentage basis (e.g., 5% to 50% of the total available storage space).

Figure 8:
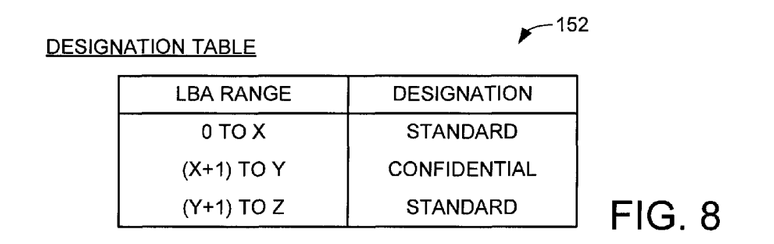
FIG. 8 shows a designation table that can be used to denote confidential and standard LBA data ranges.

Additionally or alternatively, the parameters may be selected in terms of one or more LBA ranges that are agreed-to up front as constituting confidential data ranges. For example, as illustrated by an exemplary designation table 152 in FIG. 8, the entire available LBA range is from LBA 0 to LBA Z. One or more subsets of this range, such as the range LBA (X+1) to LBA Y, may be designated as confidential data, with the remaining ranges (LBA 0 to LBA X and LBA (Y+1) to LBA Z) designated as standard data. In such case, the storage device 100 will know that data having LBAs within the confidential data range are intended to be treated as confidential data and thus stored to the confidential data portion(s) within the memory (e.g., CD portion 140 in FIG. 6).

It will be appreciated that such host level designations during device initialization are merely exemplary and are not required. In some embodiments, the designation of the confidential data portion is made independently of the host. In other embodiments, the storage device 100 makes on-the-fly allocations of available erasure blocks at such times that confidential user data are received from the host. The host can indicate that data to be stored by the storage device 100 are to be treated as confidential data in any number of ways.

For example, the host may supply data with a special designation, such as a particular indicator value consonant with a write command, which will be interpreted by the storage device 100 as indicating to the storage device that the data are to be treated as confidential data. Other indications can be used as well; for example, data transferred at particular times, or from particular hosts, can be understood as constituting confidential data.

In further embodiments, the storage device 100 can treat data from each of a particular list of hosts as confidential user data, with each host having a different CD portion assigned to it. In file-based systems, the host may send particular file names to the storage device. A list or other data structure can be maintained by the storage device to track such information. These and many other variations will readily occur to the skilled artisan in view of the present disclosure and are encompassed thereby.

Figure 9:
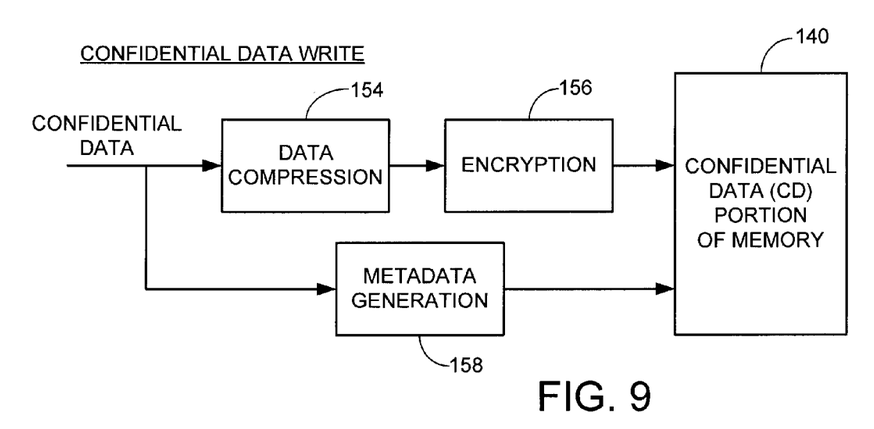
FIG. 9 sets forth an exemplary data write sequence.

An exemplary confidential write sequence is illustrated by FIG. 9. In FIG. 9, confidential data are transferred by the host device 150 to the storage device 100. This may entail the transfer of a write command to the storage device along with the associated data (e.g., "write LBAs 100-199" along with user data associated with such LBAs). This may also include a write command indicator (e.g., a value of "XXX" is appended to the write command that indicates to the storage device that the transferred data are to be treated as confidential user data).

Any type of suitable processing can be applied to the received data during the write operation. As shown in FIG. 9, such processing may include an optional data compression operation as shown by data compression engine 154. Lossless data compression can be used to reduce the total size of the written data by locating repeating strings of symbols in the input data, and using a "shorthand" system to represent such strings in such a way that fewer total bits are required to express the compressed data.

A data encryption operation is represented by encryption block 156. The encryption can include the application of a selected algorithm (cipher) which uses special information (key) to scramble the received data. The encryption step can take any number of forms, including multi-level encryption. Any suitable keys can be used, including internally and/or externally generated keys, band keys, etc. In some embodiments, the LBA value(s) associated with the data may be used in the encryption algorithm as a seed value or other input data. Once the data are encrypted, the encrypted data are written to the CD portion of the memory 140. The data may be stored as a single copy, or multiple duplicate copies may be stored in different locations within the CD portion(s) 140.

In at least some embodiments, metadata may be generated at this time by a metadata generation block 158. The metadata provide control data to track the user data and may take any suitable form. In some embodiments, the metadata identify the physical address (array, erasure block, page, starting bit, etc.) of the cells to which the encrypted data are stored. The metadata may also identify the LBA value(s) associated with the stored encrypted data and other information such as time stamp data associated with the write event, etc. The metadata may be stored in a special erasure block in the CD portion 140, or in any other suitable location.

It will be appreciated that a later received copy of the confidential data, such as a revised version of the data, may be subsequently provided to the storage device 100. In such case, the processing of FIG. 9 may be carried out to encode and store this new version of data to a different location in the CD portion 140. The new data may be written to the same erasure block, or to a different erasure block, within the CD portion. New updated metadata may also be generated. Metadata management techniques may be utilized to flag the previous copy as old, or stale data.

Figure 10:
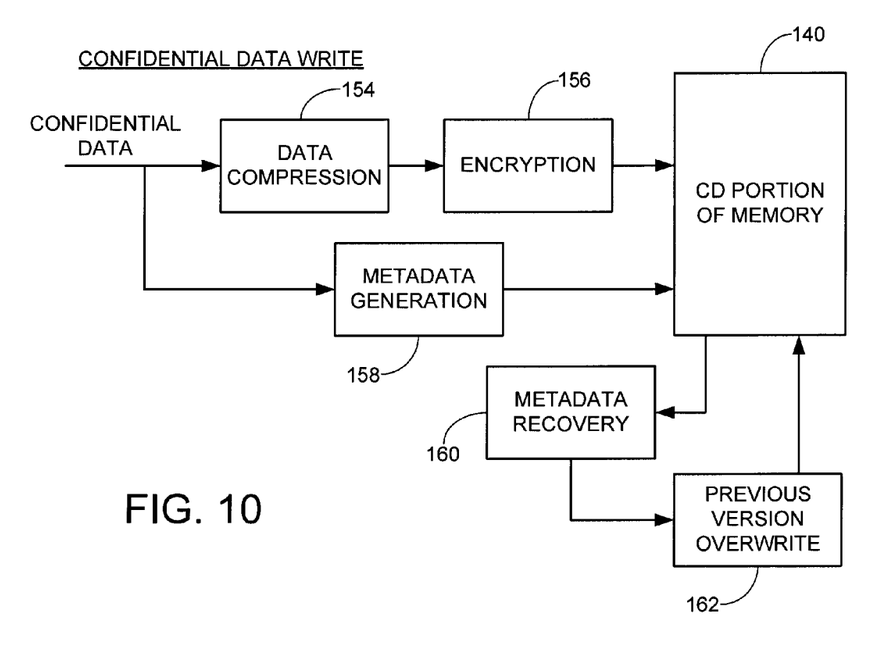
FIG. 10 shows another exemplary data write sequence.

In some embodiments, the confidential user data are handled by the storage device 100 in such a way that only one version of the confidential user data is stored in the array at a given time. Processing along these lines may be carried out in accordance with FIG. 10. FIG. 10 shows the data compression, encryption and metadata generation blocks 154, 156 and 158 from FIG. 9, and these blocks operate as described above. In addition, a metadata recovery block 160 can operate to locate the most recent previously stored copy of the data in the CD portion 140. From this data, a previous version overwrite block 162 operates to remove this previous version of the currently written confidential data set.

The block 162 may operate to simply overwrite the cells storing this previous version of data. For example, with reference again to FIG. 2, the flash memory cells storing the previous version of the confidential data may be subjected to a data overwrite information in which a maximum amount of charge is applied to the floating gates 114 of these cells (e.g., all the cells are written to state 00). Random bits may be written, or non-standard amounts of charge may be written in addition to, or in lieu of, this data overwrite step.

In other embodiments, a garbage collection operation may take place whereby the erasure block containing the most recent previous version of the confidential data is erased. This may include the need to relocate and copy over other stored data in that erasure block. Care should be taken to ensure that the new version of data being written by the operation of blocks 154, 156 and 158 is to a different erasure block.

It will be noted that, if the sequence of FIG. 10 is carried out each time that a new version of a particular set of confidential data is written to the array 104, then at any given time that a purge command is received, there will generally only be one copy of the data in the array. The sequence of FIG. 10 thus performs on-going, or advanced, purging of the data sets. This can be carried out in the background during device operation.

As desired, prior version purges can be scheduled and carried out via batch processing by the device at suitable times, such as off-hour times when the device is not experiencing full volume workloads. By careful selection of the locations to which new versions of various data sets are written to the CD portion, the wiping out of previous versions can be carried out concurrently and with minimal data relocation through the erasure of blocks containing older versions of the various data sets.

Figure 11:
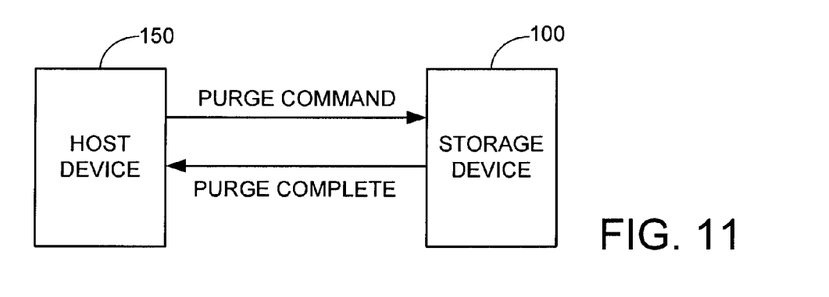
FIG. 11 presents another data exchange between a storage device and a host device.

FIG. 11 illustrates an exemplary purge command sequence. In some embodiments, the host device 150 sends a purge command to the storage device 100 to initiate the purging of a particular set of confidential data, and the storage device forwards a purge complete status back to the host when the operation is completed. The host device that initiates the purge operation may or may not be the same host device that initially configured the storage device (as in FIG. 7), and may or may not be the same device that initially provided the particular data set to the storage device 100 that is now to be purged.

In some embodiments, the purge command identifies a logical address of the data to be purged. This logical address may be a particular LBA of the set of data to be purged, or may be a range of LBAs to be purged. The logical address may also be provided in terms of a file name with which various LBAs or other logical addressing is associated. The logical address may instead by some other value that, when interpreted by the storage device, results in the identification of the various logical addresses of the data to be purged.

Regardless, the purge command exemplified in FIG. 11 is externally generated and supplied by a command source to the storage device. In response, the storage device 100 carries out the purging of all copies of the associated set of confidential data, and forwards a purge command complete status to the initiating source.

Figure 12:
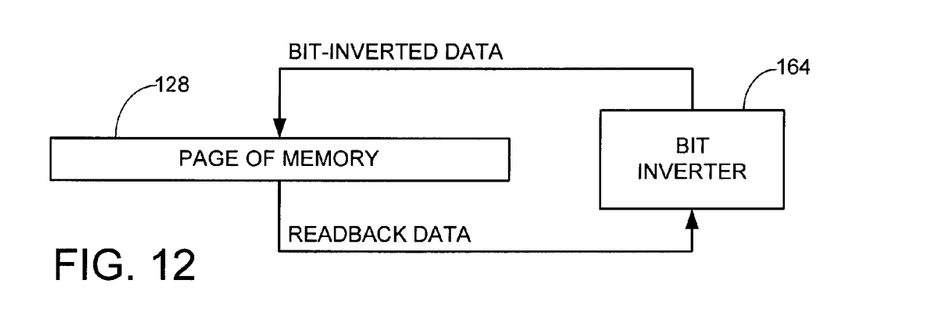
FIG. 12 shows an overwrite operation in which data are overwritten with bit inverted data.

The manner in which the data set is purged can vary depending on the circumstances. In some embodiments, a bit inverted write is used as part of the data purge operation, as illustrated in FIG. 12. For example, the data in a particular page of memory (including multiple pages or a portion of a page) are read out and supplied to a bit inverter block 164. The block 164 inverts the readback sequence to provide bit-inverted data that are thereafter overwritten to the page 128.

In some embodiments, the bit inversion process overwrites each bit with its complementary bit. For example, each logical 0 is overwritten with a 1, and vice versa. MLC cells can be handled in this fashion; for example, the sequence 01 becomes 10, the sequence 00 becomes 11, and so on. It will be appreciated that a block erasure operation can take place after the reading out of the data and prior to the overwrite. In some embodiments, a selected number of erasures and bit inverted overwrites take place, such as 3 to 8 such erasure/write operations.

Figure 13:
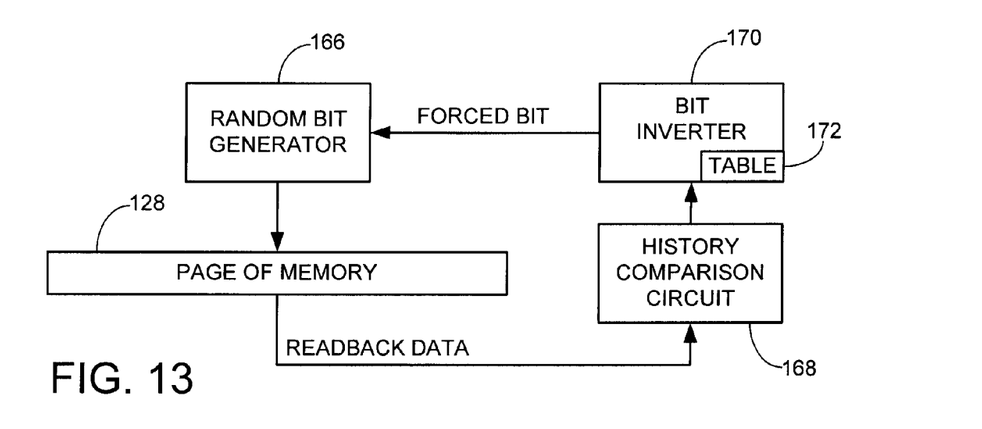
FIG. 13 provides another overwrite operation in which data are overwritten with bit inverted data.

In further embodiments, a bit inverted process can be utilized in conjunction with a random bit generation function. As shown in FIG. 13, this function can be carried out using a random bit generator 166, a history comparison circuit 168 and a bit inverter 170 with a table 172 in memory. During operation, the block can be initially erased, followed by the writing of a random bit sequence as supplied by the generator 166. This sequence is read out and supplied to the history comparison circuit 168, which tracks previous values written to each bit location.

Run length rules can be implemented so that a particular random bit value, such as a logical 1, can only be written a maximum number of times in a row to a particular cell. For example, if the maximum number is 2, then the system in FIG. 13 will detect if the random bit generator generates a logical 1 for a particular cell a third time in a row; if so, the bit inverter 170 will force a bit change at that location so that the next random sequence generated for overwrite will be forced to a new value, such as logical 0.

In this way, the block is alternately erased and written with random bits a number of times (such as 3 to 8 times), with forced bit inversions inserted as required to ensure an adequate variation of the respective written values is applied to each cell. Other alternative sequences are readily envisioned and can be implemented by the skilled artisan in view of the present disclosure.

Figure 14:
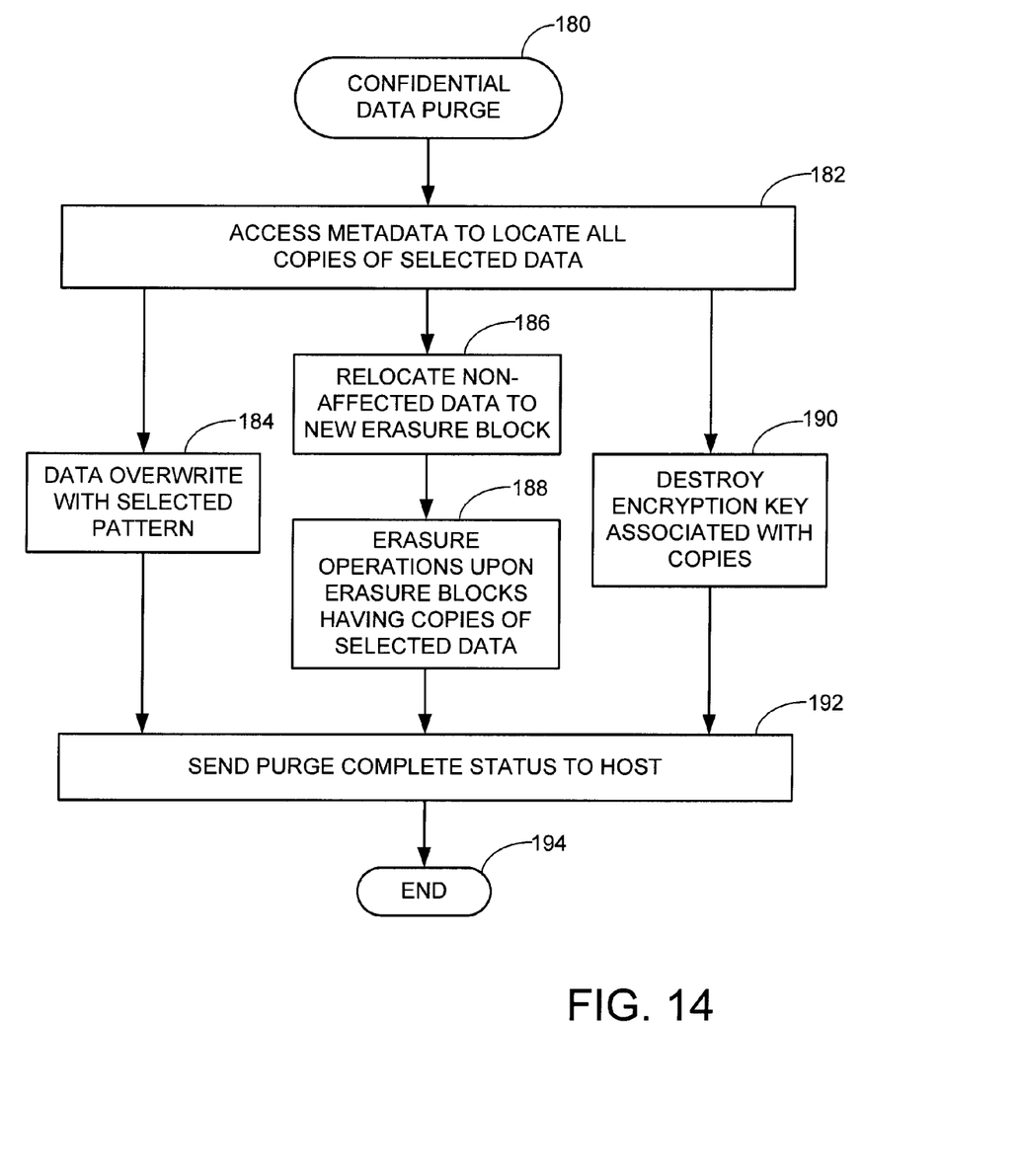
FIG. 14 is a CONFIDENTIAL DATA PURGE routine that may be carried out during the operation of FIG. 5.

FIG. 14 is an exemplary CONFIDENTIAL DATA PURGE routine 180 that may be carried out by the storage device 100 to purge the copies of a particular data set in accordance with the foregoing discussion. The routine 180 may be initiated responsive to a purge command as shown in FIG. 11.

At step 182, the metadata associated with the CD portion 140 may be accessed to identify the location(s) of all of the various copies of the selected confidential data to be purged. The steps carried out to purge these copies can vary. As shown by step 184, a data overwrite operation may be carried out to the specific location(s) at which the previous data sets are stored. This may include the overwriting of various data bits as discussed above, and may or may not include a block level erase.

Alternatively or additionally, non-affected sets of confidential data may be relocated from the erasure block(s) that store the previous version(s) of the selected data, as shown by step 186. Thereafter, block level erasures may be applied to the erasure block(s) with the previous version(s) of the selected data, step 188. As desired, multiple erasures/writes may take place as set forth in FIGS. 12-13.

In yet another alternative embodiment, the various copies of selected data associated with a particular logical address are all encrypted with a particular encryption key that is stored internally by the device in a selected memory location, as shown by step 190 in FIG. 14. This key can be destroyed, such as by being overwritten or erased as discussed above, thereby eliminating the ability to recover the various copies of this particular data set from the memory. These various steps can be carried out individually or in combination to provide different levels of security.

Once the purge operation is completed, the storage device forwards a purge complete status to the initiating source device, step 192, and the process ends at step 194. The purge complete status may be sent by the device to the host after a first purge operation has been completed that removes access to the data, such as through the key destruction approach. The device may subsequently carry out further actions in the background to further secure the device, such as overwrites/erasures of the physical locations of the data.

In still further embodiments, the storage device 100 can be configured to maintain a list of the physical locations within the memory that store latent and mapped versions of the data in the designated confidential LBAs. When the internal housekeeping routines of the device copy confidential data, this list may be extended to include the new physical addresses. When data blocks are to be purged, the corresponding entries are removed from the list.

The purging of confidential data as discussed above is readily adaptable to a variety of forms of memory, such as but not limited to magnetic discs, optical discs, STRAM, RRAM, PLC and other types of non-volatile memories. The techniques can be applied to memories that do not require a separate erasure, such as memory cells that can be transitioned from any selected programmed state to any other available programmed state using normal write processing instead of a specially configured erasure operation. Thus, the terms "erasure," "secure erasure" and the like as used herein will be understood in accordance with the foregoing discussion to describe the wiping of a memory to mask a previously written state without necessarily involving a separate erasure process that is distinct from a programming operation.

Figure 15:
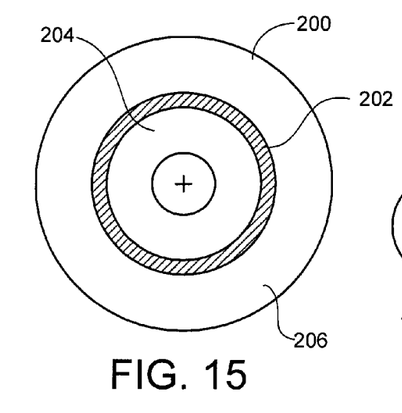
FIG. 15 shows a magnetic disc memory with which various embodiments of the present invention can be utilized.

FIG. 15 generally illustrates a rotatable recordable magnetic disc 200 on which a number of concentric tracks are defined to store user data in fixed sized blocks (sectors). A band of such tracks can be identified as a confidential data (CD) portion 202, with other portions 204, 206 serving as standard data (SD) portions. In disc based storage systems (e.g., hard disc drives) that utilize multiple axially aligned disc recording surfaces on one or more discs, the confidential data portion(s) 202 can constitute a cylinder of axially aligned tracks through the stack, or can be one or more distinct zones at different radii on the various surfaces. It will be noted that one or more surfaces may not have any CD portion 202.

Figure 16:
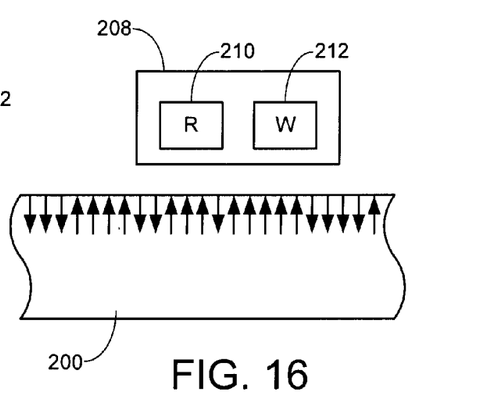
FIG. 16 illustrates a read/write transducer adjacent the disc memory of FIG. 15.

Disc memories such as 200 can be accessed by a moveable read/write transducer 208, FIG. 16, which may have separate read (R) and write (W) elements 210, 212 that are brought into close proximity to the rotating disc 200 during operation. The transducer 208 may be hydrodynamically supported adjacent the disc responsive to such rotation. The transducer 208 stores data to the disc 200 as a sequence of magnetic domains, which may extend along the media in a direction parallel to or perpendicular to the tracks.

A confidential data purge operation as discussed herein can be applied to the magnetic disc 200. In some embodiments, to securely erase a selected set of confidential data, the read element 210 can be positioned adjacent the associated track (s) on which the data sectors storing such data are located to recover the data stored thereto. A bit-inversion operation can be applied to the readback data and the write element 212 can be positioned adjacent the track during a subsequent revolution of the disc 200 to overwrite bit-inverted data. Similarly, other patterns such as random patterns can be generated and written by the write element 212 as discussed above.

As desired, radial offsets can be applied to the transducer 208 to ensure that the edges of the tracks, as well as the medial portions thereof, are sufficient overwritten a desired number of passes. A separate erasure operation can be applied but is not necessarily required, and can be carried out by performing a DC erase in which the same magnetic domain orientation is applied to the entire track by the write element between successive write cycles. Various levels of write current can be selected for passage through the write element 212 to vary the field strength of the written domains during different passes to further mask previously written data signatures.

Figure 17:
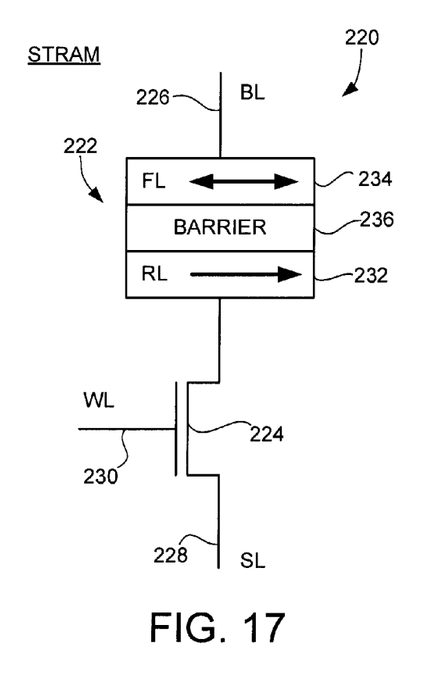
FIG. 17 illustrates a spin-torque transfer random access memory (STRAM) cell with which various embodiments of the present invention can be utilized.

FIG. 17 depicts a memory cell 220 arranged as a 1T1R STRAM memory cell. The STRAM memory cell includes a resistive memory element 222 characterized as a magnetic tunneling junction (MTJ), and a switching device 224 characterized as an nMOS transistor. The memory cell 220 is accessed by a number of control lines such as bit line (BL) 226, source line (SL) 228 and word line (WL) 230. Other connection configurations are contemplated such as a cross-point array.

The MTJ 222 includes a pinned reference layer (RL) 232 having a fixed magnetic orientation and a free layer (FL) 234 having a variable magnetic orientation. The free layer 234 is separated from the reference layer 232 by an intervening tunnel barrier layer 236. Spin-torque write currents can be passed through the memory cell to set the magnetic orientation of the free layer 234 relative to the reference layer 232 to store data. A parallel orientation in which the free layer 234 is in the same magnetic orientation as the reference layer 232 provides a relatively lower electrical resistance RL, and an anti-parallel orientation in which the free layer 234 is opposite that of the reference layer 232 provides a relatively higher electrical resistance RH. The different resistances, and hence, the programmed state of the cell 220, can be determined by passing a relatively low magnitude read current through the cell and sensing the voltage drop thereacross.

It is contemplated that the previously stored magnetic domains of the free layer 234 may be discoverable using laboratory techniques, and so the various confidential data purge approaches discussed herein can be readily applied to STRAM memory cells such as 220. For example, the existing magnetic orientation of the free layer 234 may be read, the readback data bit may be inverted, and this new inverted bit may be written to change the orientation of the free layer. Additionally or alternatively, random data may be successively written and forced bit inversions may occur to obtain the statistically desired distributions of different states. Different varying amount of write current or other parameters may be adjusted to further alter the magnetic domain signature of the free layer (and potentially other aspects of the memory cell).

Figure 18:
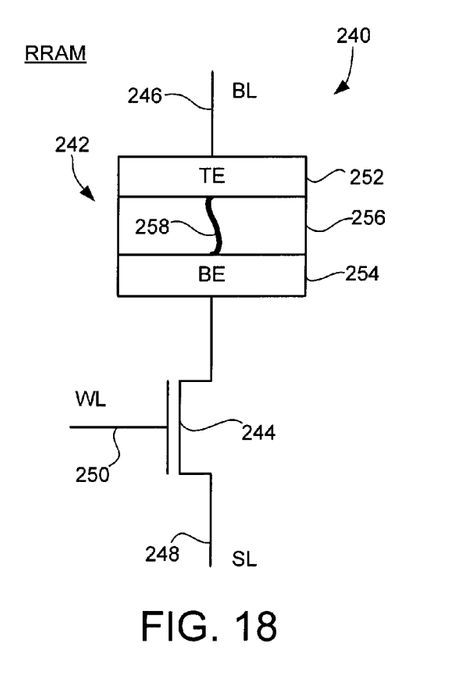
FIG. 18 illustrates a resistive random access memory (RRAM) cell with which various embodiments of the present invention can be utilized.

FIG. 18 illustrates another memory cell 240 characterized as a 1T1R RRAM cell. As with the STRAM cell in FIG. 17, the RRAM cell includes a resistive memory element 242 and a switching device 244, characterized as an nMOS transistor. The RRAM cell 240 is accessed by respective bit, word and source lines (BL, WL and SL) 246, 250 and 248.

The resistive memory element 242 includes top and bottom conductive electrodes (TE and BE) 252 and 254. These electrode layers are separated by an intervening oxide layer 256. Application of appropriate programming currents induces migration of conductive ions into the oxide layer 256 to form a conductive filament 258 that partially or completely spans the oxide layer and reduces the overall resistance of the cell. The filaments 258 can be subsequently removed by appropriate programming currents that urge migration of the ions back to the respective electrode layers.

As before, the remnants of ion migration and residual filament formation may be discoverable through laboratory analysis, enabling prior stored states to be discovered. It is contemplated that the various techniques of FIG. 5 can be readily adapted for use in RRAM cells such as FIG. 18 to mask such prior states.

While the purge operations of the present disclosure have been discussed in terms of particular locations of memory that may store sensitive user data, it will be appreciated that the same sanitizing techniques can also be applied to other regions of the memory that store metadata or other control data that may be related to the user data files for which nondestructive purging has been requested.

The various techniques disclosed herein may provide a number of benefits, including reduced power consumption, reduced wear, shorter time implementation and greater levels of signature wiping over conventional approaches. The purging operations disclosed herein can be adapted to a wide variety of memories and applications, and are not limited to any particular style or type of memory. It is contemplated that a special "purge" command may be implemented in a command set for a particular interface or host/storage device combination so that, responsive to the purge command, the storage device operations as described herein to erase all versions of the associated data set.

For purposes herein, references to "erasing" and the like will generally describe, consistent with the foregoing discussion, the altering of a storage state of the memory such as through the overwriting of the memory with different data and does not necessarily require a specially configured erasure operation. References to rows and columns will be read broadly as relational identifiers in an ordered array of elements along different axes without constituting a specific physical layout. Thus for example, the term "row" may constitute a physical column without deterring from the spirit of the present invention. Reference to a "page" will be understood broadly as an addressable block to which a multi-bit set of data can be written, and may or may not constitute a full "row" or "column" of memory cells. The term "random" will be broadly read to include "pseudo-random."

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   dividing a non-volatile memory into a confidential data portion and a standard data portion;
   storing multiple copies of a selected set of confidential user data having a common logical address in the confidential data portion, the multiple copies of the selected set of confidential data comprising an older version of the selected set of confidential information written to a first physical location and a different, newer version of the selected set of confidential data written to a different, second physical location, each of the multiple copies restricted to the confidential data portion to limit the multiple copies to a subset of a total available data space of the memory;
   receiving a data purge command from a host device that requests a purge of the selected set from the confidential portion, the host device having access to the standard data portion; and
   non-destructively purging each said copy of the selected data set from the confidential data portion responsive to the received data purge command so that the older version and the newer version of the selected set are concurrently removed from the memory and other confidential user data stored in the confidential data portion are retained.

2. The method of claim 1, further comprising a prior step of configuring the memory with a command set comprising a plurality of available commands, the command set facilitating a special data purge operation upon the confidential data portion but not the standard data portion, and wherein the received data purge command executes said special data purge operation.

3. The method of claim 1, in which each of the multiple copies of the selected set of confidential data is encrypted using a selected encryption key stored in a selected memory location, and the nondestructively purging said copy from the confidential data portion comprises erasing the selected encryption key from the selected memory location.

4. The method of claim 1, in which the storing step further comprises storing a second set of confidential user data having a different logical address to a second physical location in the confidential data portion, the second set of confidential user data remaining stored in the second physical location and available for transfer to a host responsive to a subsequent read command for said second set of confidential user data.

5. The method of claim 1, comprising a prior step of identifying a first range of logical addresses to be stored in the confidential data portion of the memory and a non-overlapping second range of logical addresses to be stored in the standard data portion of the memory, wherein the multiple copies of the selected set of confidential user data are stored to the confidential data portion responsive to the common logical address falling within the first range of logical addresses.

6. The method of claim 5, further comprising receiving a second selected set of user data having an associated logical address, determining that the associated logical address falls within the second range of logical addresses, and storing the second selected set of user data in the standard data portion of the memory.

7. The method of claim 1, wherein the memory has a total data storage capacity, and the confidential data portion has an overall data storage capacity of from 5% to 50% of the total data storage capacity of the non-volatile memory.

8. The method of claim 1, in which the non-volatile memory is characterized as a flash memory arranged as a plurality of erasure blocks, the confidential data portion comprises a subset of said erasure blocks, and the non-destructive purging step comprises executing a specially configured secure erasure operation wherein multiple erasures are successively applied to the first physical location and to the second physical location with a data pattern being written to the first physical location and to the second physical location between each successive pairs of said erasures.

9. The method of claim 1, carried out by a storage device adapted to be coupled to a host device, the storage device adapted to receive data from the host device for storage as logical sectors each having an associated logical address, wherein the method further comprises assigning a subset of the total range of logical addresses to the confidential data portion.

10. The method of claim 1, wherein the multiple copies of the selected set of confidential data further comprise an oldest version of the selected set of confidential information written to a third physical location, the non-destructively purging each said copy of the selected data set from the confidential data portion responsive to the received data purge command further comprising the concurrent removal of the oldest version of the selected set from the memory while other confidential user data stored in the confidential data portion are retained.

11. An apparatus comprising a non-volatile memory divided into multiple portions including a confidential data portion adapted to store confidential user data from a host device and a standard data portion adapted to store standard user data from the host device, and a controller adapted to execute a nondestructive purge operation upon the non-volatile memory by erasing multiple copies of a selected set of confidential user data having a common logical address and different physical addresses in the confidential data portion responsive to a purge command externally supplied to the memory by the host device so that non-purged confidential user data remains stored in the confidential data portion, the nondestructive purge operation comprising a secure erasure operation wherein multiple erasures are successively applied to each of the different physical addresses with a data pattern being written thereto between each successive pairs of said erasures, the controller issuing a purge complete status at a conclusion of the secure erasure operation, the multiple copies comprising an older stale version of the selected set of confidential user data and a newer current version of the selected set of confidential user data, both the older stale version and the newer current version concurrently purged responsive to the externally supplied purge command, the controller further adapted to restrict the storage of the confidential user data, including the multiple copies of the selected set of user data, to the confidential data portion to reduce complexity of the nondestructive purge operation by limiting the locations of the confidential user data to a subset of a total available data space of the memory.

12. The apparatus of claim 11, in which the controller is further adapted to reference metadata associated with the confidential data portion to identify a first physical address at which the older stale version is stored and a second physical address at which the newer current version is stored, and to direct the erasing of said confidential user data stored at each of the first physical address and the second physical address during the nondestructive purge operation.

13. The apparatus of claim 11, wherein the externally supplied purge command is an available command in a command set that can be issued to the memory to facilitate various data access operations, wherein the command set is configured such that the purge command can be applied to any data within the confidential data portion but not to any data in the standard data portion.

14. The apparatus of claim 11, in which the controller is further adapted to transfer an application program to a host device during initialization of the apparatus, the application program requesting configuration parameters from the host device to identify a total data storage capacity of the confidential data portion.

15. The apparatus of claim 11, in which the externally supplied purge command is supplied by a host device, the purge command identifying said common logical address of the selected set of confidential user data, and wherein the controller subsequently issues the purge complete status to the host device at the conclusion of the secure erasure operation.

16. The apparatus of claim 11, in which the non-volatile memory is characterized as a flash memory arranged as a plurality of erasure blocks, the confidential data portion comprises a subset of said erasure blocks, and the non-destructive purging operation comprises executing a specially configured erasure operation to concurrently remove accumulated charge from the flash memory cells in at least one of the erasure blocks in the confidential data portion.

17. A method comprising:
dividing a non-volatile memory into a confidential data portion adapted to store confidential user data from a host device and a standard data portion adapted to store standard user data from the host device;
storing a first version of a selected set of user data to the confidential data portion, the first version of the selected set of user data having a selected logical address and a first physical address;
storing a different, second version of the selected set of user data to the confidential data portion, the second version of the selected set of user data having said selected logical address and a second physical address different from the first physical address;
receiving a purge command from the host device to purge data associated with the selected logical address; and
non-destructively purging the first version of the selected set of user data and the second version of the selected set of user data from the confidential data portion of the memory responsive to the received purge command so that non-purged confidential user data having a different logical address remains stored in the confidential data portion, the purge command comprising a type of command that can be applied to any data in the confidential data portion but not to any data in the standard data portion, the storing of the first and second versions of the selected set of user data further comprising affirmatively restricting the first and second versions of the selected set of user data to the confidential data portion to reduce complexity of the non-destructive purging thereof.

18. The method of claim 17, further comprising receiving a standard set of user data for storage to the memory, and storing the standard set of user data to the standard portion of the memory, wherein the standard set of user data have a second logical address.

19. The method of claim 18, further comprising assigning a first range of logical addresses to the confidential data portion and a non-overlapping second range of logical addresses to the standard data portion, wherein the first and second versions of the selected set of user data are stored to the confidential data portion responsive to the selected logical address falling within the first range, and wherein the standard set of user data are stored to the standard portion of the memory responsive to the second logical address falling within the second range.

20. The method of claim 17, wherein the non-destructively purging of the first version of the selected set of user data and the second version of the selected set of user data comprises a secure erasure operation wherein an encryption key associated with said first and second versions of the selected set of user data is purged from the confidential data portion.

* * * * *

UNITED STATES PATENT AND TRADEMARK OFFICE
CERTIFICATE OF CORRECTION

| | | |
|---|---|---|
| PATENT NO. | : 9,015,401 B2 | Page 1 of 1 |
| APPLICATION NO. | : 13/096658 | |
| DATED | : April 21, 2015 | |
| INVENTOR(S) | : Laszlo Hars et al. | |

It is certified that error appears in the above-identified patent and that said Letters Patent is hereby corrected as shown below:

In The Claims

In Col. 13, line 67
"purging said" should be "purging each said"

Signed and Sealed this
Seventeenth Day of May, 2016

Michelle K. Lee
*Director of the United States Patent and Trademark Office*